United States Patent [19]
Szente-Varga

[11] 3,730,968
[45] May 1, 1973

[54] TUBULAR ENCLOSED 3-PHASE HIGH VOLTAGE LINE

[75] Inventor: Hermann Paul Szente-Varga, Nussbaumen, Switzerland

[73] Assignee: Aktiengesellschaft Brown, Boveri & Cie, Baden, Switzerland

[22] Filed: Nov. 2, 1971

[21] Appl. No.: 194,839

[30] Foreign Application Priority Data

Dec. 3, 1970 Switzerland...................17930/70

[52] U.S. Cl...................174/27, 174/10, 174/16 B, 174/99 B
[51] Int. Cl...................H01b 9/06
[58] Field of Search...................174/24, 27, 28, 29, 174/16 B, 15 C, 99 B, 113, 115, 10

[56] References Cited

UNITED STATES PATENTS

| | | |
|---|---|---|
| 2,215,290 | 9/1940 | Hobart...................174/27 |
| 2,141,894 | 12/1938 | Alexanderson...................174/27 X |
| 3,331,911 | 7/1967 | Whitehead...................174/28 X |
| 3,585,271 | 6/1971 | Reynolds...................174/16 B X |
| 3,391,243 | 7/1968 | Whitehead...................174/28 |
| 3,164,667 | 1/1965 | Frowein...................174/27 |
| 3,610,807 | 10/1971 | Whitehead...................174/28 X |
| 1,043,164 | 10/1912 | Sprong et al....................174/27 |
| 2,149,223 | 2/1939 | Mason...................174/27 |

FOREIGN PATENTS OR APPLICATIONS 438,560   11/1935   Great Britain...................174/27

*Primary Examiner*—Bernard A. Gilheany
*Assistant Examiner*—A. T. Grimley
*Attorney*—Ralph E. Parker et al.

[57] ABSTRACT

A three-phase high voltage line in which the phase conductors are located within a grounded tubular, gas-pressurized casing. To facilitate assembly of the conductors within the casing, supporting rings are spaced along and surround the conductors, and the latter are secured within and connected to the ring by means of insulators. Projections which provide either a sliding or rolling contact are located on the outer surface of the rings and these engage the inner surface of the casing and serve as guides for introducing the conductor and ring assemblies into the casing.

3 Claims, 4 Drawing Figures

Patented May 1, 1973 3,730,968

TUBULAR ENCLOSED 3-PHASE HIGH VOLTAGE LINE

The present invention relates to an improved construction for an encapsulated three-phase high voltage line whose phase conductors are arranged on three insulators arranged in one plane within a grounded metallic tubular casing filled with insulating gas under pressure.

Such arrangements of a high voltage line are known, for example, from German Pat. No. 949,670. There the three-phase conductors are carried at the inner ends of three supporting insulators having an angular spacing of 120° about the axis of the casing which in turn are secured by their outer ends directly on the inner face of the tubular casing. Such an arrangement, however, is suitable only for relatively short conductor bar lengths, in particular for bus bars in encased circuit systems. The high voltage line can then be assembled only in a section-by-section manner, machining of the casing being required for the attachment of the supporting insulators, owing to which a relatively high production cost results.

The present invention has for its principal object to provide a solution where there is no real mechanical and structural dependence between the phase conductor system and the tubular casing. According to the invention, this is achieved in that the three insulators carrying the phase conductors are secured to the inner sides of longitudinally spaced carrying rings which include on their outer surface projections which enable the carrying rings to be guided within the tubular casing. In this manner the tubular casing becomes a simple pipe which requires no machining of any kind for the support of the phase conductor system, since the latter and the tubular casing constitute two separate structural components. As essential advantages it is thus achieved, besides a cheaper tubular casing, that the three-phase conductor system constitutes a separately portable assembly which can be mounted, tested, and transported independently of the outer casing.

The accompanying drawings illustrate examples of execution of the inventive concept wherein.

Figure 1A:
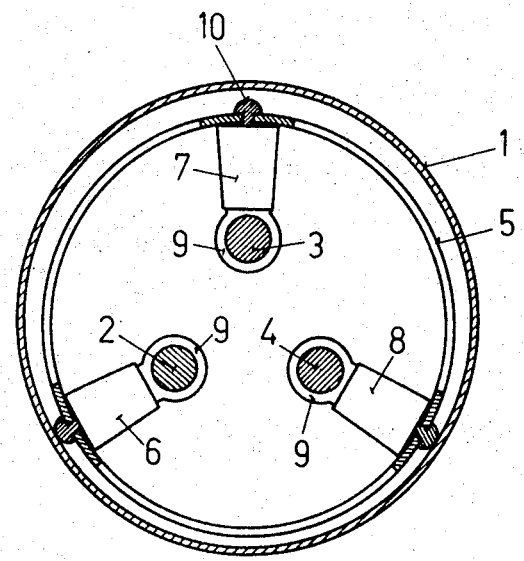
FIGS. 1a and 1b show in transverse and longitudinal section respectively a high voltage line with the three-phase conductors arranged in an equilateral triangle.
Figure 1B:
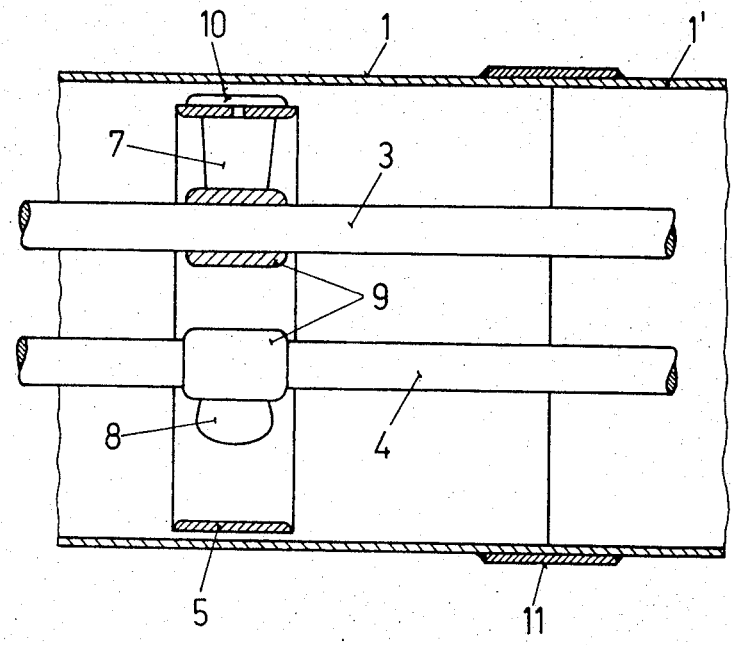

With reference now to FIGS. 1a and 1b the outer, grounded tubular casing which can be of any length is illustrated in the form of section 1,1' which abut and are welded together gas-tight by means of a pipe sleeve 11. The phase conductors 2,3,4 which are oriented 120° apart about the casing axis are surrounded and firmly connected by means of ring armatures 9 with the inner ends of insulators 6,7,8 spaced 120° apart and the latter are in turn secured at their outer ends to the inner surface of the carrying ring 5. The carrying ring 5 may be made of metallic material or of insulating material and includes on its outer surface projections 10 which may be designated either as sliding or rolling bodies and serve to guide the carrying ring within the outer tubular 1. Three projections 10 from ring 5 of equal height which are spaced uniformly about the circumference of the ring, can, for example, be located respectively at each of the three insulators 6 to 8, and a circle circumscribing and touching the radially outermost points on the three projections which is concentric with ring 5 has a diameter less than that of the inner surface of the cylindrical casing 1. Thus, as depicted in FIG. 1a, and likewise in FIG. 3 discussed below but wherein the projections 10 are not located in radial alignment with the conductor support insulators, when rings 5 are in position inside of casing 1, two of the three projections 10 rest upon the inner surface of the casing 1 while the third projection stands clear. This facilitates insertion of the conductor-insulator-ring sub-assembly into the outer casing 1. Thus, a phase conductor system of great length, assembled outside the tubular casing, can be introduced or inserted into the tubular casing relatively easily and simply at its destination. A relatively large clearance exists between the tubular casing 1 and the carrying ring 5, owing to which there results also certain insensitivity of the high voltage line when sagging, i.e. upon deviation from straight conduction of the section and upon twisting.

Figure 2:
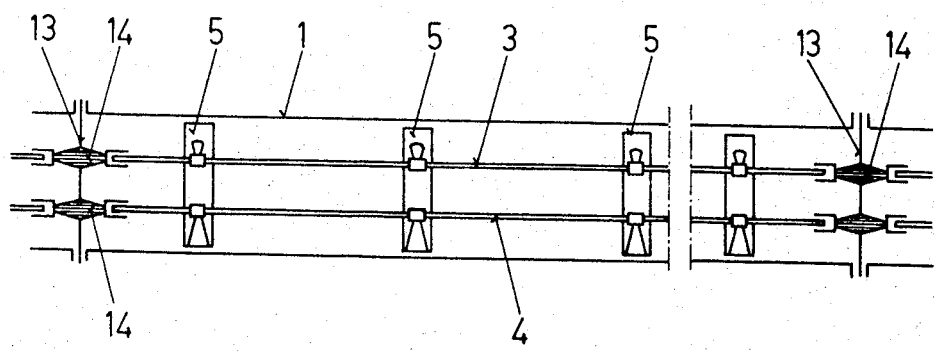
FIG. 2 shows somewhat more schematically a longer line section similar to FIGS. 1a, 1b but which is bulkheaded at intervals as to gas.

FIG. 2 shows schematically a high voltage line where the construction is the same in FIG. 1b and where for a longer line section with many carrying rings 5, gas-tight bulkheads are provided along the line. For this purpose, gas-tight bulkhead walls 13 are installed from time to time, which carry gas-tight lead-throughs 14, with which the phase conductors 2,3,4 are connected, for example, by self-engaging longitudinally movable slide or elongated connections.

Figure 3:
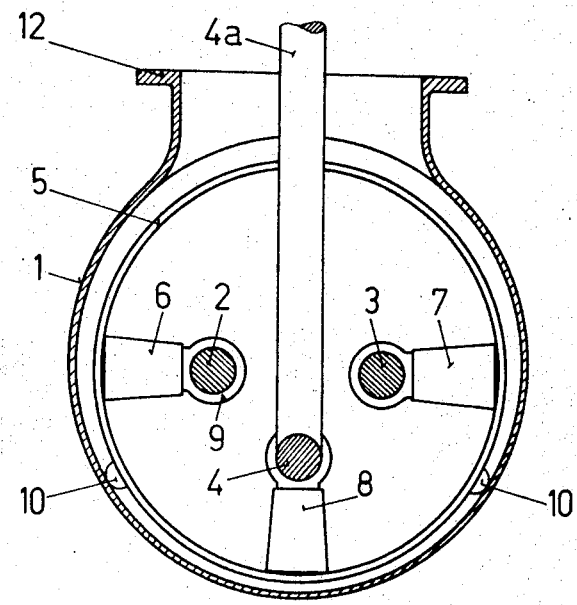
FIG. 3 shows in transverse section a form of the encased high voltage line for use as bus bar.

In the embodiment of FIG. 3, the insulators 6,7,8 for the phase conductors 2,3,4 have an angular spacing of 90° referred to the ring axis in contrast to the 120° spacing of FIG. 1a. This arrangement is advantageous when the high voltage line is used as a bus bar, because then, as shown for the phase conductor 4, the lead-off conductor 4a can expediently be passed transversely out of the casing through a transverse connecting outlet 12 of the casing 1.

I claim:

1. In a three-phase high voltage line in which the three phase conductors are located within a cylindrical casing, the improvement wherein a plurality of supporting rings are spaced along and surround said conductors, each said conductor being held in its proper spaced relation within said rings relative to the other conductors by means of insulator means secured to aid ring, and each said ring including on the outer surface thereof a plurality of circumferentially distributed projections engageable with the inner surface of aid casing and which function as guides for introducing a sub-assembly of said rings and conductors into said casing.

2. A three-phase high voltage line as defined in claim 1 wherein said projections are of equal height and a circle circumscribing and touching the radially outermost points on the projections and concentric with said ring has a diameter less than that of the inner surface of said cylindrical casing.

3. A three-phase high-voltage line as defined in claim 1 wherein said cylindrical casing is constituted by a plurality of axial sections jointed together at their adjoining ends, wherein transversely extending gas-tight bulkheads are located at the joints where the axial sections of said casing are joined together, and wherein said bulkheads are provided with gas-tight lead-throughs for said conductors and which have the same spacial arrangement as the conductors, the opposite ends of said lead-throughs providing self-engaging connecting means for the corresponding ends of said conductors which are likewise composed of axial sections having substantially the same length as the casing sections.

* * * * *